(12) United States Patent
Hasegawa et al.

(10) Patent No.: US 12,722,053 B2
(45) Date of Patent: Sep. 1, 2026

(54) GOLF CLUB SHAFT

(71) Applicant: SUMITOMO RUBBER INDUSTRIES, LTD., Kobe (JP)

(72) Inventors: Hiroshi Hasegawa, Kobe (JP); Yuma Yamamoto, Kobe (JP); Kota Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 1057 days.

(21) Appl. No.: 17/886,078

(22) Filed: Aug. 11, 2022

(65) Prior Publication Data

US 2023/0079511 A1 Mar. 16, 2023

(30) Foreign Application Priority Data

Sep. 2, 2021 (JP) ................................ 2021-143208

(51) Int. Cl.

*A63B 53/10* (2015.01)
*B32B 1/08* (2006.01)
*B32B 27/08* (2006.01)
*B32B 27/18* (2006.01)
*B32B 27/38* (2006.01)

(52) U.S. Cl.

CPC ................ *A63B 53/10* (2013.01); *B32B 1/08* (2013.01); *B32B 27/08* (2013.01); *B32B 27/18* (2013.01); *A63B 2209/023* (2013.01); *B32B 27/38* (2013.01); *B32B 2250/24* (2013.01); *B32B 2255/10* (2013.01); *B32B 2262/101* (2013.01); *B32B 2307/546* (2013.01); *B32B 2307/718* (2013.01); *B32B 2597/00* (2013.01)

(58) Field of Classification Search

CPC ...................................................... A63B 53/10
USPC ........................................ 473/316, 318, 319
See application file for complete search history.

(56) References Cited

U.S. PATENT DOCUMENTS 7,404,771 B2 * 7/2008 Kumamoto ............ A63B 53/10 473/319
7,517,288 B2 * 4/2009 Kumamoto ............ A63B 53/10 473/319
7,524,248 B2 * 4/2009 Kumamoto ............ A63B 53/10 473/319
8,021,244 B2 * 9/2011 Kato ...................... A63B 60/46 473/319

(Continued)

FOREIGN PATENT DOCUMENTS

JP 2013-90904 A 5/2013
JP 2014-171582 A 9/2014
JP 2018-397 A 1/2018

*Primary Examiner* — Joseph B Baldori
(74) *Attorney, Agent, or Firm* — Birch, Stewart, Kolasch & Birch, LLP

(57) ABSTRACT

Provided is a hollow shaft including a hoop layer. The shaft weight is 50 g or less. The shaft has a flexural rigidity EI ($N \cdot m^2$) and a shaft wall thickness t (mm). In a first region having a distance of 200 mm to 300 mm from the tip end, EI/t is 10 or greater and 40 or less. In a second region having a distance of 800 mm to 900 mm from the tip end, EI/t is 45 or greater and 80 or less. The hoop layer includes a partial hoop layer disposed in a part of an entire length of the shaft. The partial hoop layer includes a specific butt hoop layer that is not present in the first region and that is disposed over an entirety of the second region. The specific butt hoop layer has a thickness of 0.05 mm or greater.

17 Claims, 6 Drawing Sheets

(56) References Cited

U.S. PATENT DOCUMENTS 8,777,772 B2 * 7/2014 Hasegawa .............. A63B 53/10
473/319
8,900,068 B2 * 12/2014 Hasegawa .............. A63B 53/10
473/316
8,915,796 B2 * 12/2014 Yashiki .................. A63B 53/10
473/319
8,920,266 B2 * 12/2014 Takeuchi ............... A63B 60/54
473/409
8,936,516 B2 * 1/2015 Yashiki .................. A63B 53/10
473/319
8,998,745 B2 * 4/2015 Hasegawa .............. A63B 60/42
473/316
9,079,083 B2 * 7/2015 Hasegawa .............. A63B 60/46
9,211,454 B2 * 12/2015 Matsunaga ............ A63B 60/00
9,387,378 B2 * 7/2016 Shimono ................ A63B 60/00
9,498,687 B2 * 11/2016 Nakamura ............. A63B 53/10
9,757,625 B2 * 9/2017 Nakano .................. A63B 53/10
9,795,847 B2 * 10/2017 Nakamura ............. A63B 53/10
10,086,245 B2 * 10/2018 Nakano .................. A63B 60/46
10,213,668 B2 * 2/2019 Takeuchi ............... A63B 53/12
10,265,592 B2 * 4/2019 Nakamura ............. A63B 53/10
10,384,104 B2 * 8/2019 Kaneko .................. A63B 60/00
10,420,988 B2 * 9/2019 Nakamura ............. A63B 53/14
10,420,995 B2 * 9/2019 Takasu ................... A63B 60/42
11,007,412 B2 * 5/2021 Takasu ................... A63B 53/10
2013/0090184 A1 4/2013 Hasegawa et al.
2018/0001166 A1 * 1/2018 Nakano .................. A63B 53/10
2020/0164254 A1 * 5/2020 Nakamura .............. B29C 70/32
2020/0338409 A1 * 10/2020 Takasu ................... A63B 53/10
2022/0126178 A1 * 4/2022 Nakano .............. A63B 60/0081
2023/0079511 A1 * 3/2023 Hasegawa .............. A63B 53/10
473/319

* cited by examiner

GOLF CLUB SHAFT

CROSS REFERENCE TO RELATED APPLICATION

This application claims priority to Japanese Patent Application No. 2021-143208 filed on Sep. 2, 2021. The entire contents of this Japanese Patent Application are hereby incorporated by reference.

BACKGROUND

Technical Field

The present disclosure relates to golf club shafts.

Description of the Related Art

A lightweight shaft is advantageous for improvement of flight distance. A shaft designed for average golfers particularly has a tendency to have a reduced weight. JP2014-171582A discloses a shaft that has a reduced weight with a bias-layer configuration.

SUMMARY

The entire wall thickness of a shaft needs to be thinner for pursuing weight reduction. Such a shaft in which the entire wall thickness is made thin, however, has an insufficient strength in a region that extends from its grip side to its middle portion, which is largely deformed when the shaft bends during a swing. Accordingly, one may consider selectively reinforcing this region. However, it has been found that, for average golfers whose head speed is relatively slow, such a reinforcement leads to a high flexural rigidity in this region, does not give a proper bending feel to such golfers, and causes deterioration in easiness of swing.

One example of the present disclosure is to provide a shaft that is lightweight and easy to swing by suppressing an increase of the flexural rigidity of a portion that is largely deformed when the shaft bends while reinforcing this portion.

A golf club shaft according to one aspect is formed by a plurality of fiber reinforced resin layers. The shaft includes a tip end and a butt end. The shaft is hollow. The shaft has a weight of less than or equal to 50 g. The shaft has a flexural rigidity EI ($N \cdot m^2$) and a shaft wall thickness t (mm) at each position in an axial direction of the shaft. In a first region that extends from a position located 200 mm apart from the tip end to a position located 300 mm apart from the tip end, EI/t is greater than or equal to 10 and less than or equal to 40. In a second region that extends from a position located 800 mm apart from the tip end to a position located 900 mm apart from the tip end, EI/t is greater than or equal to 45 and less than or equal to 80. The fiber reinforced resin layers include straight layers, a bias layer, and hoop layers. The straight layers include a full length straight layer that is disposed over an entire length of the shaft, and a partial straight layer that is disposed in a part of the entire length of the shaft. The hoop layers include a full length hoop layer that is disposed over the entire length of the shaft, and a partial hoop layer that is disposed in a part of the entire length of the shaft. The partial hoop layer includes a specific butt hoop layer that is not present in the first region and that is disposed over an entirety of the second region. The specific butt hoop layer has a thickness of greater than or equal to 0.05 mm.

DESCRIPTION OF THE PREFERRED EMBODIMENTS

Embodiments of the present disclosure will be described in detail below with reference to the drawings as necessary.

The term "layer" and the term "sheet" are used in the present disclosure. The "layer" is a term used for after being wound. In contrast, the "sheet" is a term used for before being wound. The "layer" is formed by winding the "sheet". That is, the wound "sheet" forms the "layer".

In the present disclosure, the same symbol is used in the layer and the sheet. For example, a layer formed by sheet s1 is referred to as layer s1.

In the present disclosure, the term "axial direction" means the axial direction of a shaft. The axial direction is the direction of a center line Z of the shaft. In the present disclosure, the term "circumferential direction" means the circumferential direction of a shaft. In the present disclosure, the term "radial direction" means the radial direction of a shaft. Unless otherwise described, the term "length" in the present disclosure means a length in the axial direction. Unless otherwise described, the term "distance" in the present disclosure means a distance in the axial direction. Unless otherwise described, the term "position" in the present disclosure means a position in the axial direction.

Figure 1:
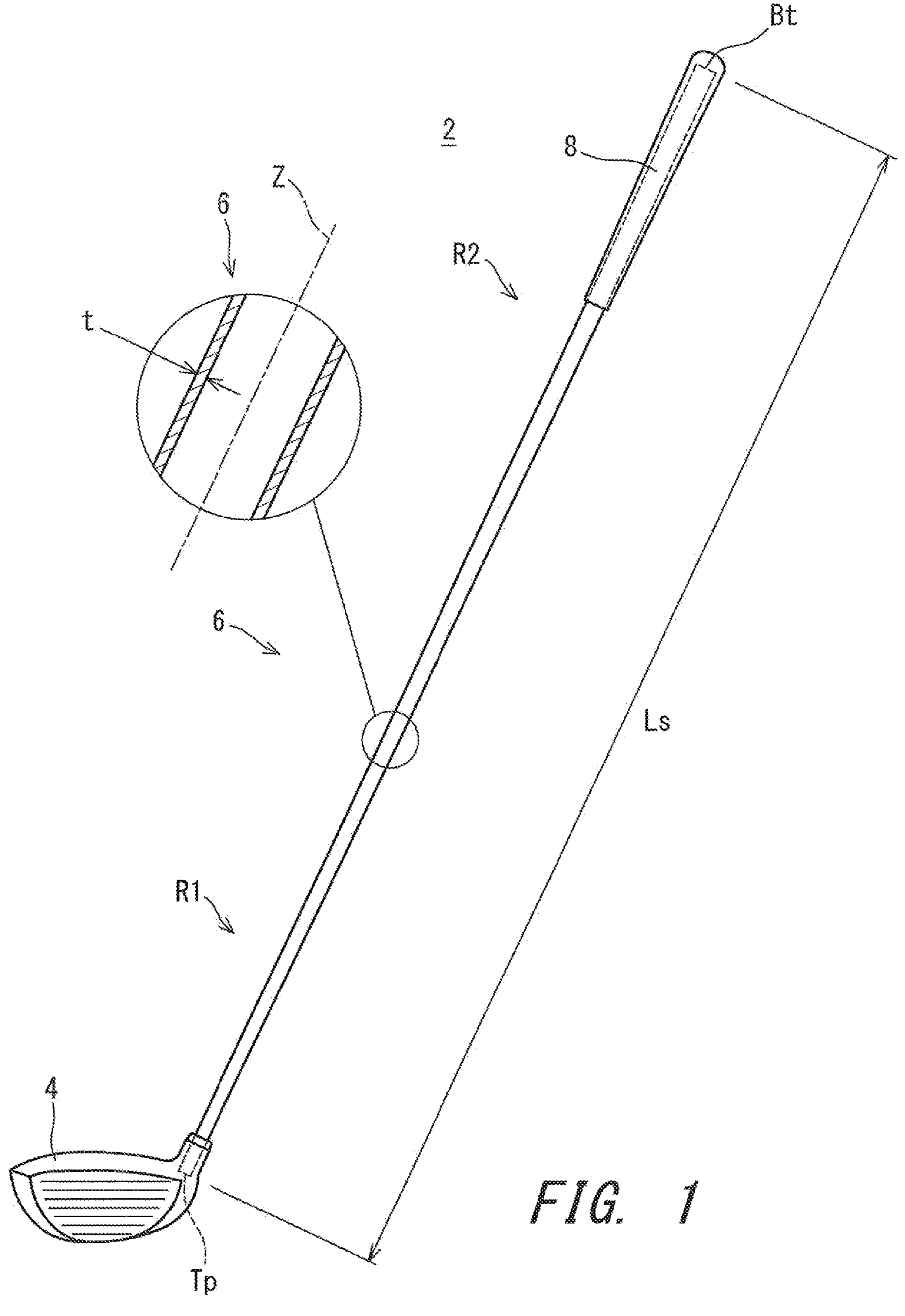
FIG. 1 shows an overall view of a golf club that includes a golf club shaft according to a first embodiment, and an enlarged view in FIG. 1 shows a cross section of the golf club shaft.

FIG. 1 shows a golf club 2 that includes a golf club shaft 6 according to the present disclosure. The golf club 2 includes a head 4, the shaft 6, and a grip 8. The head 4 is provided at a tip portion of the shaft 6. The grip 8 is provided at a butt portion of the shaft 6. The shaft 6 is a shaft for a wood type club. The golf club 2 is a driver (number 1 wood). The shaft 6 is a shaft used for drivers.

There is no limitation on the head 4 and the grip 8. Examples of the head 4 include a wood type head, a utility type head, an iron type head, and a putter head. In the present embodiment, the head 4 is a wood type head. The head 4 is a driver head.

The shaft 6 is formed by a plurality of fiber reinforced resin layers. The kind of fibers is not limited. In the present embodiment, a carbon fiber reinforced resin layer and a glass fiber reinforced resin layer are used as the fiber reinforced resin layers. An enlarged view in FIG. 1 shows a cross section of the shaft 6. As shown in this cross sectional view, the shaft 6 is in a tubular form. The shaft 6 has a hollow structure. The shaft 6 includes a tip end Tp and a butt end Bt. In the golf club 2, the tip end Tp is located inside the head 4. In the golf club 2, the butt end Bt is located inside the grip 8.

The shaft 6 has a wall thickness t (see enlarged view in FIG. 1). The wall thickness t is a distance between the inner surface and the outer surface of the shaft 6. The wall thickness t is measured in the radial direction. The wall thickness t can be calculated by dividing a difference between the outer diameter and the inner diameter of the shaft 6 by 2. The wall thickness t is equal to the sum total of thicknesses of prepregs stuck together. The wall thickness t can vary depending on the position in the axial direction. In the present disclosure, the symbol "t" that denotes the value of the wall thickness of the shaft is also used as a reference symbol in drawings.

A double-pointed arrow Ls in FIG. 1 shows the length of the shaft 6. The length Ls is a distance from the tip end Tp to the butt end Bt. This length Ls is measured along the center line Z of the shaft 6. That is, the length Ls is measured in the axial direction.

The shaft 6 is formed by winding a plurality of prepreg sheets. In the prepreg sheets, fibers are oriented substantially in one direction. Such a prepreg in which fibers are oriented substantially in one direction is also referred to as a UD prepreg. The term "UD" stands for unidirectional. The prepreg sheets may be made of a prepreg other than UD prepreg. For example, fibers contained in the prepreg sheets may be woven. In the present disclosure, the prepreg sheet(s) is/are also simply referred to as a sheet(s).

Each prepreg sheet contains fibers and a resin. The resin is also referred to as a matrix resin. Carbon fibers and glass fibers are exemplified as the fibers. The matrix resin is typically a thermosetting resin.

Examples of the matrix resin in the prepreg sheet include a thermosetting resin and a thermoplastic resin. From the viewpoint of shaft strength, the matrix resin is preferably a thermosetting resin, and more preferably an epoxy resin.

The shaft 6 is manufactured by a sheet-winding method. In the prepreg, the matrix resin is in a semi-cured state. In the shaft 6, the prepreg sheets are wound and cured. This "cured" means that the semi-cured matrix resin is cured. The curing process is achieved by heating. The manufacturing processes of the shaft 6 includes a heating process. The heating process cures the matrix resin in the prepreg sheets.

Figure 2:
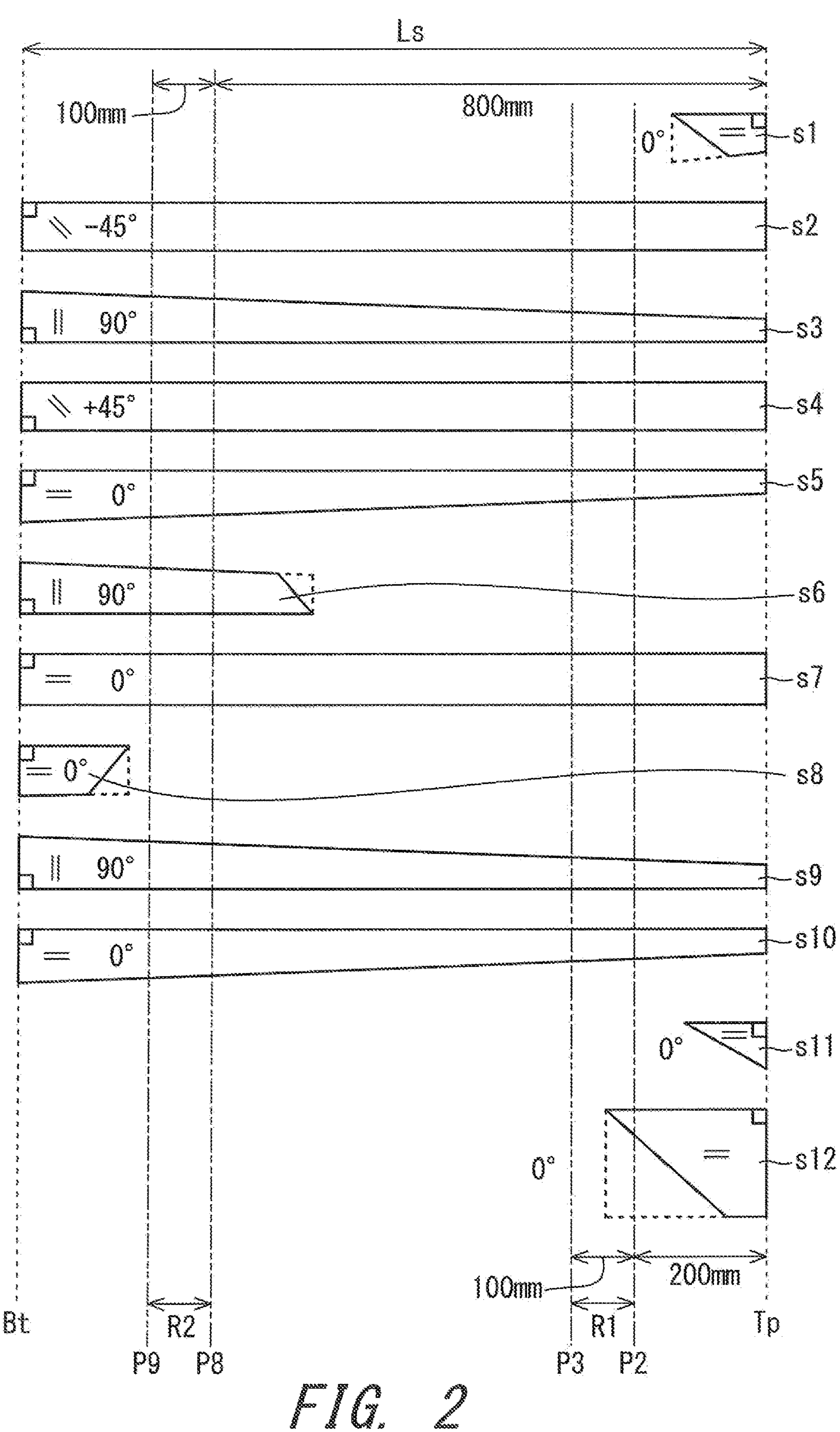
FIG. 2 is a developed view of the golf club shaft in FIG. 1.

FIG. 2 is a developed view of prepreg sheets constituting the shaft 6. FIG. 2 shows the sheets constituting the shaft 6. The shaft 6 is constituted by the sheets. In the embodiment of FIG. 2, the shaft 6 is constituted by 12 sheets. The shaft 6 includes a first sheet s1 to a twelfth sheet s12. The developed view shows the sheets constituting the shaft in order from the radial inside of the shaft. The sheets are wound in order from the sheet located on the uppermost side in the developed view. In FIG. 2, the horizontal direction of the figure coincides with the axial direction. In FIG. 2, the right side of the figure is the tip side of the shaft. In FIG. 2, the left side of the figure is the butt side of the shaft.

FIG. 2 shows not only the winding order of the sheets but also the position of each of the sheets in the axial direction. For example, in FIG. 2, an end of the sheet s1 is located at the tip end Tp.

The shaft 6 includes a straight layer, a bias layer, and a hoop layer. An orientation angle of the fibers (hereinafter referred to as fiber orientation angle) is described for each of the sheets in FIG. 2. A sheet described as "0°" is a straight sheet. The straight sheet forms the straight layer.

The straight layer is a layer in which the fiber orientation angle is substantially set to 0° with respect to the axial direction. The fiber orientation may not completely be parallel to the shaft axial direction due to an error in winding, for example. In the straight layer, an absolute angle of the fiber orientation angle with respect to the shaft axis line is less than or equal to 10°. The absolute angle means an absolute value of an angle (fiber orientation angle) formed between the shaft axis line and the orientation of fibers. That is, "the absolute angle is less than or equal to 10°" means that "the fiber orientation angle is greater than or equal to −10 degrees and less than or equal to +10 degrees".

In the embodiment of FIG. 2, sheets (straight sheets) that form straight layers are the sheet s1, the sheet s5, the sheet s7, the sheet s8, the sheet s10, the sheet s11 and the sheet s12. The straight layers make a great contribution to flexural rigidity and flexural strength.

The bias layer is a layer in which the fiber orientation is substantially inclined with respect to the axial direction. The bias layer makes a great contribution to torsional rigidity and torsional strength. Preferably, bias layers are constituted by a pair of two sheets (herein after referred to as a sheet pair) in which fiber orientation angles of the respective sheets are inclined inversely to each other. Preferably, the sheet pair includes: a layer having a fiber orientation angle of greater than or equal to −60° and less than or equal to −30°; and a layer having a fiber orientation angle of greater than or equal to 30° and less than or equal to 60°. That is, the absolute angle in the bias layers is preferably greater than or equal to 30° and less than or equal to 60°.

In the shaft 6, sheets (bias sheets) that form the bias layers are the sheet s2 and the sheet s4. The sheet s2 and the sheet s4 constitute a sheet pair. The sheet pair is wound in a state where the sheets are stuck together.

In FIG. 2, the fiber orientation angle is described for each sheet. The plus sign (+) and minus sign (−) used with the fiber orientation angle indicate inclined direction of the fibers. A sheet having a plus fiber orientation angle and a sheet having a minus fiber orientation angle are combined in each sheet pair. In the sheet pair, fibers in respective sheets are inclined inversely to each other. It should be noted that, although the fiber orientation angle of the sheet s2 is the same as the fiber orientation angle of the sheet s4 in FIG. 2, the sheet s4 is reversed and stuck on the sheet s2 so that the fiber orientation angles of those sheets are inclined inversely to each other.

The hoop layer is a layer that is disposed so that the fiber orientation substantially coincides with the circumferential direction of the shaft. Preferably, in the hoop layer, the absolute angle of the fiber orientation angle is substantially set to 90° with respect to the shaft axis line. However, the fiber orientation angle to the shaft axial direction may not be completely set to 90° due to an error in winding, for example. In the hoop layer, the absolute angle of the fiber orientation angle is usually greater than or equal to 80° and less than or equal to 90°.

The hoop layer makes a great contribution to crushing rigidity and crushing strength of a shaft. The crushing rigidity means a rigidity against crushing deformation. The crushing deformation means a deformation caused by a crushing force that is applied to the shaft inward in the radial direction of the shaft. In a typical crushing deformation, the cross section of the shaft is deformed from a circular shape to an elliptical shape. The crushing strength means a strength against the crushing deformation.

In the embodiment of FIG. 2, prepreg sheets (hoop sheets) that constitutes hoop layers are the sheet s3, the sheet s6 and the sheet s9. The hoop layer s3 is sandwiched between the bias layer s2 and the bias layer s4. The hoop layer s6 is sandwiched between the straight layer s5 and the straight layer s7. The hoop layer s9 is sandwiched between the straight layer s8 (or the straight layer s7) and the straight layer s10.

For manufacturing the shaft 6 shown in FIG. 2, a united sheet is used. The united sheet is formed by sticking a plurality of sheets together.

In the embodiment of FIG. 2, three united sheets are used. A first united sheet is the combination of the sheet s2, the sheet s3 and the sheet s4. A second united sheet is the combination of the sheet s6 and the sheet s7. A third united sheet is the combination of the sheet s9 and the sheet s10.

As described above, in the present disclosure, the sheets and the layers are classified by the fiber orientation angle. Furthermore, in the present disclosure, the sheets and the layers are classified by their length in the axial direction.

A layer disposed over an entire length in the axial direction of the shaft is referred to as a full length layer. A sheet disposed over an entire length in the axial direction of the shaft is referred to as a full length sheet. A wound full length sheet forms a full length layer. On the other hand, a layer partly disposed in the axial direction of the shaft is referred to as a partial layer. A sheet partly disposed in the axial direction of the shaft is referred to as a partial sheet. A wound partial sheet forms a partial layer.

A layer that is the bias layer and the full length layer is referred to as a full length bias layer. A layer that is the straight layer and the full length layer is referred to as a full length straight layer. A layer that is the hoop layer and the full length layer is referred to as a full length hoop layer.

In the embodiment of FIG. 2, the full length bias layers are formed by the sheet s2 and the sheet s4. The full length straight layers are formed by the sheet s5, the sheet s7, and the sheet s10. The shaft 6 includes the plurality of full length straight layers s5, s7, and s10. The full length hoop layers are formed by the sheet s3 and the sheet s9. The shaft 6 includes the partial hoop layer s6 sandwiched between the full length straight layers s5 and s7.

A layer that is the bias layer and the partial layer is referred to as a partial bias layer. A layer that is the straight layer and the partial layer is referred to as a partial straight layer. A layer that is the hoop layer and the partial layer is referred to as a partial hoop layer.

The embodiment of FIG. 2 does not include a partial bias layer. The partial straight layers are formed by the sheet s1, the sheet s8, the sheet s11, and the sheet s12. The partial hoop layer is formed by the sheet s6. Another partial hoop layer than the partial hoop layer s6 is not provided.

The sheet s6 forms a butt partial hoop layer. The butt partial hoop layer s6 is disposed in the butt portion of the shaft 6. One end of the butt partial hoop layer s6 is located at the butt end Bt. Another butt partial hoop layer than the butt partial hoop layer s6 is not provided.

The sheet s1, the sheet s11 and the sheet s12 are tip partial straight layers. The tip partial straight layers are disposed in the tip portion of the shaft 6. One ends of the respective tip partial straight layers s1, s11 and s12 are located at the tip end Tp.

The sheet s8 forms a butt partial straight layer. The butt partial straight layer s8 is disposed in the butt portion of the shaft 6. One end of the butt partial straight layer is located at the butt end Bt. Another butt partial straight layer than the butt partial straight layer s8 is not provided.

Hereinafter, the outline of manufacturing processes of the shaft 6 will be described.

[Outline of Manufacturing Processes of Shaft]

(1) Cutting Process

Prepreg sheets are cut into respective desired shapes in the cutting process. Each of the sheets shown in FIG. 2 is cut out in this process.

The cutting may be performed by a cutting machine or may be manually performed. In the manual case, a cutter knife is used, for example.

(2) Sticking Process

In the sticking process, each united sheet described above is produced by sticking a plurality of sheets together. In the sticking process, heating and/or pressing step(s) may be carried out.

(3) Winding Process

A mandrel is prepared in the winding process. A typical mandrel is made of a metal. A mold release agent is applied to the mandrel. Furthermore, a resin having tackiness is applied to the mandrel. The resin is also referred to as a tacking resin. The cut sheets are wound around the mandrel. The tacking resin facilitates the application of the end part of a sheet to the mandrel.

A wound body is obtained in the winding process. The wound body is obtained by winding the prepreg sheets around the outside of the mandrel. For example, the winding is achieved by rolling the object to be wound on a plane. The winding may be manually performed or may be performed by a machine. The machine is referred to as a rolling machine.

(4) Tape Wrapping Process

A tape is wrapped around the outer circumferential surface of the wound body in the tape wrapping process. The tape is also referred to as a wrapping tape. The wrapping tape is helically wrapped while tension is applied to the tape so that there is no gap between adjacent windings. The wrapping tape applies pressure to the wound body. The pressure contributes to reduction of voids.

(5) Curing Process

In the curing process, the wound body after being subjected to the tape wrapping is heated. The heating cures the matrix resin. In the curing process, the matrix resin fluidizes temporarily. The fluidization of the matrix resin can discharge air from between the sheets or in each sheet. The fastening force of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The process of removing the wrapping tape is preferably performed after the process of extracting the mandrel.

(7) Process of Cutting Off Both Ends

Both end portions of the cured laminate are cut off in the process. The cutting off flattens the end face of the tip end Tp and the end face of the butt end Bt.

(8) Polishing Process

The surface of the cured laminate is polished in the process. Spiral unevenness is present on the surface of the cured laminate as the trace of the wrapping tape. The polishing removes the unevenness to smooth the surface of the cured laminate.

(9) Coating Process

The cured laminate after the polishing process is subjected to coating.

The shaft 6 has a flexural rigidity at each position in the axial direction. A flexural rigidity (or its value) is also referred to as EI. In the present disclosure, the unit of EI is "$N \cdot m^2$".

Figure 3:
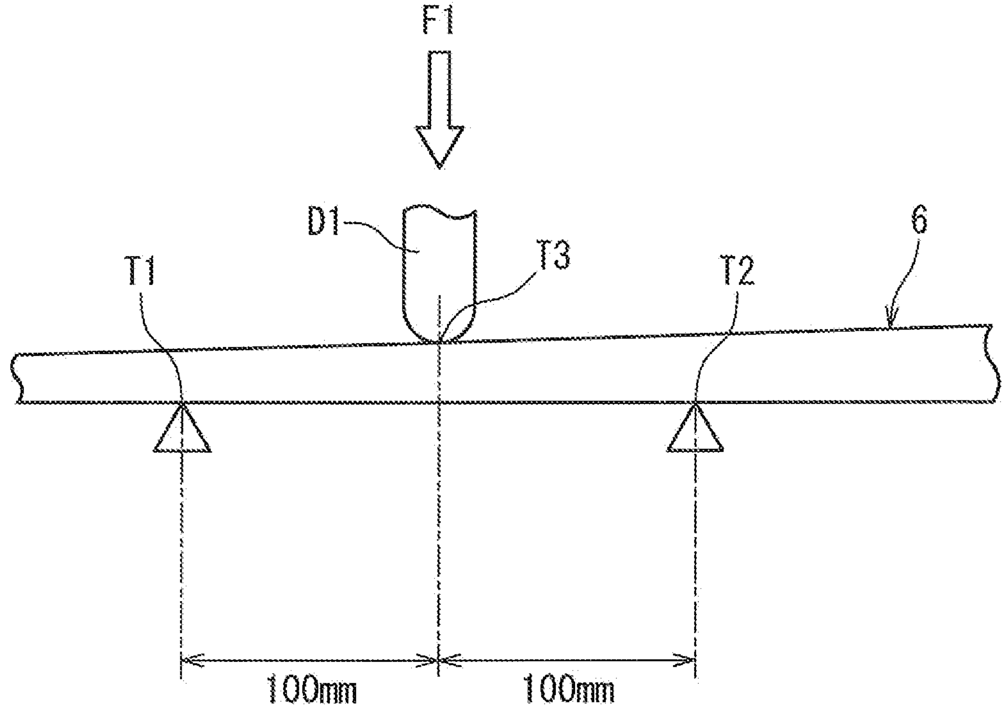
FIG. 3 is a schematic diagram illustrating a method for measuring a flexural rigidity EI.

FIG. 3 shows a method for measuring EI. As a measuring device, a universal testing machine "model 2020 (maximum load: 500 kg)" produced by Intesco Co., Ltd. can be used. The shaft 6 is supported from below at a first supporting point T1 and at a second supporting point T2. In the state where the shaft 6 is supported, a load F1 is applied at a measurement point T3 from above. The load F1 is applied vertically downward. The distance between the point T1 and the point T2 is 200 mm. The measurement point T3 is a point that divides the distance between the point T1 and the point T2 into two equal parts. The amount of bending (flexure) H when the load F1 is applied is measured. The load F1 is applied by an indenter D1. The tip end of the indenter D1 is a cylindrical surface having a radius of curvature of 5 mm. The downwardly moving speed of the indenter D1 is 5 mm/min. When the load F1 reaches 196 N, the indenter D1 is stopped, and the amount of bending H in this state is measured. The amount of bending H is a distance in the vertical direction between the position of the point T3 before the load F1 is applied and the position of the point T3 when the indenter D1 is stopped. EI is calculated by the following formula:

$$EI(N\cdot m^2)=F1\times L^3/(48\times H),$$

where, F1 denotes a maximum load (N), L is a distance (m) between the supporting points, and H is the amount of bending (m). The maximum load F1 is 196 N. The distance L between the supporting points is 0.2 m.

A strength at each position of the shaft 6 can be measured by a three-point flexural strength test in accordance with SG standards. This test is a test (CPSA0098) for golf club shafts stipulated by Consumer Product Safety Association in JAPAN. Measurements at four points (point T, point A, point B, and point C) are stipulated in this test. In the present disclosure, however, this strength test can be also used for tests at other positions than these four points. In the measurements at positions other than the four points, the measurement method stipulated for point A, point B, and point C (span: 300 mm) is used as long as possible. In a measurement at positions, for example, in the tip portion and the butt portion of the shaft 6 in which the span cannot set to be 300 mm, the measurement method for point T (span: 150 mm) is used.

As shown in FIG. 2, the shaft 6 includes a first region R1 and a second region R2. The first region R1 is a region that extends from a position located 200 mm apart from the tip end Tp to a position located 300 mm apart from the tip end Tp. The second region R2 is a region that extends from a position located 800 mm apart from the tip end Tp to a position located 900 mm apart from the tip end Tp.

The shaft 6 includes a point P2 located 200 mm apart from the tip end Tp, a point P3 located 300 mm apart from the tip end Tp, a point P8 located 800 mm apart from the tip end Tp, and a point P9 located 900 mm apart from the tip end Tp. The first region R1 is a region that extends from the point P2 to the point P3. The second region R2 is a region that extends from the point P8 to the point P9.

As described above, the shaft 6 includes the partial hoop layer s6 disposed in a part of the entire length Ls of the shaft 6. As shown in FIG. 2, the partial hoop layer s6 is a partial hoop layer that is disposed over an entirety of the second region R2. This partial hoop layer is also referred to as a specific butt hoop layer. The specific butt hoop layer s6 is disposed from a position located on the tip side with respect to the point P8 to the butt end Bt. The tip-side end of the specific butt hoop layer s6 is positioned between the point P3 and the point P8. The butt-side end of the specific butt hoop layer s6 is positioned on the butt side with respect to the point P9. In the present embodiment, the butt-side end of the specific butt hoop layer s6 is positioned at the butt end Bt. Alternatively, the butt-side end of the specific butt hoop layer s6 does not have to be positioned at the butt end Bt. The specific butt hoop layer s6 is not present in the first region R1. The shaft 6 includes only one partial hoop layer which is the specific butt hoop layer s6.

As described above, the shaft 6 includes the partial straight layer s8. The partial straight layer s8 is a butt partial straight layer. As shown in FIG. 2, the tip-side end of the partial straight layer s8 is positioned on the butt side with respect to the point P9. The partial straight layer s8 is not present in the second region R2. The partial straight layer s8 is disposed from a position located on the butt side with respect to the point P9 to the butt end Bt.

In the present disclosure, a butt partial straight layer that is disposed on the butt side with respect to the second region R2 is also referred to as a specific butt straight layer. The partial straight layer s8 is the specific butt straight layer. The specific butt straight layer s8 is not present in the second region R2. The shaft 6 does not include a partial straight layer in the second region R2. The shaft 6 includes only one butt partial straight layer which is the specific butt straight layer s8.

The shaft 6 includes tip partial straight layers s1 and s11 which are located on the tip side with respect to the first region R1. The length of the tip partial straight layer s1 is less than or equal to 200 mm. The butt-side end of the tip partial straight layer s1 is located on the tip side with respect to the point P2. The length of the tip partial straight layer s11 is less than or equal to 200 mm. The butt-side end of the tip partial straight layer s11 is located on the tip side with respect to the point P2.

The shaft 6 includes the tip partial straight layer s12 which is present in the first region R1. The length of the tip partial straight layer s12 is greater than 200 mm. The butt-side end of the tip partial straight layer s12 is positioned on the butt side with respect to the point P2. The butt-side end of the tip partial straight layer s12 is positioned between the point P2 and the point P3.

EI/t can be calculated at each position in the shaft 6. EI/t is a ratio of a flexural rigidity EI ($N\cdot m^2$) to a shaft wall thickness t (mm).

In the shaft 6, EI/t is suppressed in the second region R2. A large flexural deformation occurs in the second region R2 when the shaft bends during a swing. Further, since the second region R2 is close to a position gripped by a golfer, the bending in the second region R2 is likely to be felt by the golfer. From the viewpoint of obtaining a shaft that has an increased strength and is lightweight, it is preferable to selectively reinforce the second region R2 which is subjected to a large deformation. This reinforcement, however, leads to an excessively large flexural rigidity in the second region R2 particularly for average golfers whose head speed is relatively slow. It has been found that, as a result, bending is not felt by golfers and shaft feeling during a swing deteriorates. By increasing the wall thickness t in the second region R2 while preventing the flexural rigidity EI from becoming excessively large in the second region R2, it becomes possible to obtain a shaft that is easy to swing and that has a sufficient strength. From this viewpoint, EI/t in the second region R2 is preferably less than or equal to 80, more preferably less than or equal to 70, and still more preferably less than or equal to 60. When EI/t is excessively small, the flexural rigidity EI becomes too small thereby causing an excessively large bending, and/or the wall thickness t becomes excessively large thereby making it difficult to reduce the shaft weight. From this viewpoint, EI/t in the second region R2 is preferably greater than or equal to 45, more preferably greater than or equal to 46, and still more still preferably greater than or equal to 47.

It should be noted that the above-mentioned average golfers whose head speed is relatively slow mean golfers who swing a driver at a head speed of about from 30 to 42 m/s.

From the viewpoint of easiness of swing, EI in the second region R2 is preferably less than or equal to 45 ($N \cdot m^2$), more preferably less than or equal to 40 ($N \cdot m^2$), and still more preferably less than or equal to 35 ($N \cdot m^2$). When the second region R2 is excessively deformed, the shaft strength may decrease and/or the shaft may become difficult to swing. From this viewpoint, EI in the second region R2 is preferably greater than or equal to 15 ($N \cdot m^2$), more preferably greater than or equal to 20 ($N \cdot m^2$), and still more preferably greater than or equal to 25 ($N \cdot m^2$).

From the viewpoint of strength of the second region R2, the wall thickness t in the second region R2 is preferably greater than or equal to 0.50 mm, more preferably greater than or equal to 0.52 mm, still more preferably greater than or equal to 0.54 mm, and yet still more preferably greater than or equal to 0.56 mm. From the viewpoint of weight reduction of the shaft 6, the wall thickness t in the second region R2 is preferably less than or equal to 0.68 mm, more preferably less than or equal to 0.66 mm, still more preferably less than or equal to 0.64 mm, and yet still more preferably less than or equal to 0.62 mm.

An excessively large flexural rigidity in the first region R1 can cause an insufficient bending of the tip portion of the shaft, which can reduce the head speed. From the viewpoint of having a sufficient wall thickness t to increase the strength while preventing the flexural rigidity from becoming excessively large, EI/t in the first region R1 is preferably less than or equal to 40, more preferably less than or equal to 35, and still more preferably less than or equal to 30. When EI/t is excessively small, the flexural rigidity EI becomes too small thereby causing an excessively large bending, and/or the wall thickness t becomes excessively large thereby making it difficult to reduce the shaft weight. From this viewpoint, EI/t in the first region R1 is preferably greater than or equal to 10, more preferably greater than or equal to 15, and still more preferably greater than or equal to 20.

From the viewpoint of head speed, EI in the first region R1 is preferably less than or equal to 30 ($N \cdot m^2$), more preferably less than or equal to 25 ($N \cdot m^2$), and still more preferably less than or equal to 20 ($N \cdot m^2$). An excessively large deformation in the first region R1 can cause reduction in strength of the shaft and/or an insufficient recovery from bending, which can lead to reduction in head speed. From this viewpoint, EI in the first region R1 is preferably greater than or equal to 8 ($N \cdot m^2$), more preferably greater than or equal to 10 ($N \cdot m^2$), and still more preferably greater than or equal to 12 ($N \cdot m^2$).

It should be noted that the above-mentioned recovery from bending means a phenomenon in which bent shaft returns to an unbent state after the shaft is bent such that the head delays with respect to the travel direction of a swing. The recovery from bending in downswing increases head speed.

From the viewpoint of strength of the first region R1, the wall thickness t in the first region R1 is preferably greater than or equal to 0.52 mm, more preferably greater than or equal to 0.54 mm, still more preferably greater than or equal to 0.56 mm, and yet still more preferably greater than or equal to 0.58 mm. From the viewpoint of weight reduction of the shaft 6, the wall thickness t in the first region R1 is preferably less than or equal to 0.78 mm, more preferably less than or equal to 0.76 mm, still more preferably less than or equal to 0.74 mm, and yet still more preferably less than or equal to 0.72 mm.

By disposing the specific butt hoop layer s6 in the second region R2, it becomes possible to reinforce the second region R2 while suppressing an increase of the flexural rigidity EI for obtaining a proper amount of bending. This makes it possible to obtain the shaft 6 which is lightweight, has a sufficient strength, and is easy to swing.

From the viewpoint of reinforcing the entirety of the second region R2, the length in the axial direction of the specific butt hoop layer s6 is preferably greater than or equal to 350 mm, more preferably greater than or equal to 400 mm, and still more preferably greater than or equal to 450 mm. From the viewpoint of weight reduction of the shaft 6, the length in the axial direction of the specific butt hoop layer s6 is preferably less than or equal to 650 mm, more preferably less than or equal to 600 mm, and still more preferably less than or equal to 550 mm.

The thickness of the specific butt hoop layer s6 is larger than that of a normal hoop layer. The specific butt hoop layer s6 is thicker than the full length hoop layer s3. The specific butt hoop layer s6 is thicker than the full length hoop layer s9. The thickness of the specific butt hoop layer s6 is greater than or equal to 1.8 times the thickness of each of the full length hoop layers s3 and s9.

It has been found that an increase of the flexural rigidity EI in the second region R2 is suppressed and the strength of the second region R2 is further increased by increasing the thickness of the specific butt hoop layer s6. From this viewpoint, the thickness of the specific butt hoop layer s6 is preferably greater than or equal to 0.05 mm, more preferably greater than or equal to 0.06 mm, still more preferably greater than or equal to 0.07 mm, and yet still more preferably greater than or equal to 0.08 mm. From the viewpoint of weight reduction of the shaft 6, the thickness of the specific butt hoop layer s6 is preferably less than or equal to 0.11 mm, more preferably less than or equal to 0.10 mm, and still more preferably less than or equal to 0.09 mm.

The thickness of the specific butt hoop layer s6 is denoted by Ta (mm), and the thickness of the full length hoop layer s3 or s9 is denoted by Tb (mm). Tb is the thickness of the thickest full length hoop layer. For example, when the thickness of the full length hoop layer s3 is different from the thickness of the full length hoop layer s9 in the shaft 6, the larger one of these thicknesses is the thickness Tb. From the viewpoint of increasing the strength of the second region R2 while suppressing an increase of the flexural rigidity EI in the second region R2 and from the viewpoint of reducing the thickness of the full length hoop layers thereby reducing the weight of the shaft 6, Ta/Tb is preferably greater than or equal to 1.6, more preferably greater than or equal to 1.8, and still more preferably greater than or equal to 2.0. An excessively large thickness Ta increases the weight of the shaft 6. From this viewpoint, Ta/Tb is preferably less than or equal to 3.0, more preferably less than or equal to 2.8, and still more preferably less than or equal to 2.6.

The shaft 6 includes a full length straight layer that has a resin content of less than or equal to 20% by weight. This full length straight layer is also referred to as a low resin content full length straight layer. In the shaft 6, the layer s5 and the layer s7 are the low resin content full length straight layers. From the viewpoint of availability of material, the resin content of the low resin content full length straight layers is preferably greater than or equal to 18% by weight.

As shown in FIG. 2, the low resin content full length straight layer s5 is in contact with the inside of the specific butt hoop layer s6. This low resin content full length straight layer s5 is also referred to as a first low resin content full length straight layer. The low resin content full length straight layer s7 is in contact with the outside of the specific butt hoop layer s6. The low resin content full length straight layer s7 is also referred to as a second low resin content full length straight layer. The specific butt hoop layer s6 is sandwiched between the first low resin content full length straight layer s5 and the second low resin content full length straight layer s7. The resin content of the specific butt hoop layer s6 is greater than the resin content of each of the low resin content full length straight layers s5 and s7.

The two low resin content full length straight layers contribute to weight reduction of the shaft 6. On the other hand, such a layer having a low resin content can cause reduction in adhesive strength between this layer and its adjacent layer. By interposing the specific butt hoop layer s6 having a wall thickness t of greater than or equal to 0.05 mm and a resin content of greater than 20% by weight between the low resin content layers s5 and s7, a reduction in adhesive strength between layers in the second region R2 can be prevented. This can improve the strength of the second region R2. From this viewpoint, the resin content of the specific butt hoop layer s6 is preferably greater than or equal to 22% by weight, more preferably greater than or equal to 23% by weight, and still more preferably greater than or equal to 24% by weight. From the viewpoint of weight reduction of the shaft 6, the resin content of the specific butt hoop layer s6 is preferably less than or equal to 40% by weight, more preferably less than or equal to 35% by weight, and still more preferably less than or equal to 30% by weight. It should be noted that, in the present disclosure, the resin content of a layer is regarded as the resin content of a prepreg that forms the layer.

As shown in FIG. 2, the shaft 6 includes the tip partial straight layer s1 and the tip partial straight layer s12. The tip partial straight layer s1 is located inside the full length bias layers s2 and s4. The tip partial straight layer s1 is the innermost layer of the shaft 6. The tip partial straight layer s12 is located outside the full length bias layers s2 and s4. The tip partial straight layer s12 is the outermost layer of the shaft 6. The tip partial straight layer s12 is longer than the tip partial straight layer s1. The fiber elastic modulus of the tip partial straight layer s12 is greater than the fiber elastic modulus of the tip partial straight layer s1. The tip partial straight layer s1 does not reach the first region R1. The tip partial straight layer s1 is not present in the first region R1. The tip partial straight layer s12 reaches the first region R1. The tip partial straight layer s12 includes a portion that is present in the first region R1. Such a configuration of the layers s1 and s12 can effectively disperse flexural deformation so that the flexural deformation extends from the tip portion of the shaft 6 to the first region R1, and can alleviate stress concentration at the joint portion between the shaft 6 and the head 4.

The fiber elastic modulus of the tip partial straight layer s1 is preferably less than or equal to 10 t/mm$^2$. This can increase the impact absorbing energy of the tip portion of the shaft 6 without excessively increasing the flexural rigidity of the tip portion. From this viewpoint, the fiber elastic modulus of the tip partial straight layer s1 is preferably less than or equal to 10 t/mm$^2$, more preferably less than or equal to 9 t/mm$^2$, and still more preferably less than or equal to 8 t/mm$^2$. From the viewpoint of strength of fibers, the fiber elastic modulus of the tip partial straight layer s1 is greater than or equal to 3 t/mm$^2$, more preferably greater than or equal to 4 t/mm$^2$, and still more preferably greater than or equal to 5 t/mm$^2$.

The tip partial straight layers may include a glass fiber reinforced layer that is reinforced with glass fibers. In the shaft 6, the tip partial straight layer s1 is the glass fiber reinforced layer. The use of glass fibers can increase the impact absorbing energy while suppressing the flexural rigidity.

Ends of partial straight layers do not present in the second region R2. The ends of the partial straight layers generate a great fluctuation in the flexural rigidity profile of the shaft, and thus can cause stress concentration. Since the ends of the partial straight layers are not present in the second region R2, the strength of the second region R2 can be improved.

As described above, the partial straight layer s8 is a specific butt straight layer that does not reach the second region R2. The specific butt straight layer s8 reinforces a portion gripped by golfers and its vicinity and does not increase the flexural rigidity of the second region R2. For this reason, the shaft 6 gives a proper bending feel to average golfers whose head speed is relatively slow, and is easy to swing for such golfers. In addition, the specific butt straight layer s8 is short and does not reach the second region R2, which contributes to weight reduction of the shaft 6.

The fiber elastic modulus of the specific butt straight layer s8 is preferably less than or equal to 10 t/mm$^2$. This can increase strength without excessively increasing the flexural rigidity of the butt portion of the shaft 6. From this viewpoint, the fiber elastic modulus of the specific butt straight layer s8 is preferably less than or equal to 10 t/mm$^2$, more preferably less than or equal to 9 t/mm$^2$, and still more preferably less than or equal to 8 t/mm$^2$. From the viewpoint of strength of fibers, the fiber elastic modulus of the specific butt straight layer s8 is preferably greater than or equal to 3 t/mm$^2$, more preferably greater than or equal to 4 t/mm$^2$, and still more preferably greater than or equal to 5 t/mm$^2$.

The specific butt straight layer s8 may be a glass fiber reinforced layer that is reinforced with glass fibers. The use of glass fibers can suppress the flexural rigidity while reinforcing the butt portion of the shaft 6.

From the viewpoint of suppressing an increase of the flexural rigidity in the second region R2, the length in the axial direction of the specific butt straight layer s8 is preferably less than or equal to 300 mm, more preferably less than or equal to 250 mm, and still more preferably less than or equal to 200 mm. From the viewpoint of reinforcing the portion gripped by golfers, the length in the axial direction of the specific butt straight layer s8 is preferably greater than or equal to 140 mm, more preferably greater than or equal to 160 mm, and still more preferably greater than or equal to 180 mm.

The shaft 6 includes the tip partial straight layer s1 which is a glass fiber reinforced layer, and the butt partial straight layer s8 which is a glass fiber reinforced layer. Glass fiber has a specific gravity higher than that of carbon fiber. By disposing the glass fiber reinforced layers at respective ends of the shaft 6, the moment of inertia of the shaft 6 is increased. As a result, the behavior of the shaft 6 during a swing can be stabilized. The stabilized behavior of the shaft 6 leads to a stabilized shot. The rotation axis of this moment of inertia is a straight line that passes through the center of gravity of the shaft 6 and is perpendicular to the center line Z.

From the viewpoint of weight reduction, the shaft weight is preferably less than or equal to 50 g, more preferably less than or equal to 48 g, still more preferably less than or equal to 46 g, still more preferably less than or equal to 44 g, and yet still more preferably less than or equal to 42 g. From the viewpoint of strength, the shaft weight is preferably greater than or equal to 34 g, more preferably greater than or equal to 36 g, and still more preferably greater than or equal to 38 g.

In the present disclosure, a shaft in which the second region R2 tends to be largely deformed when the shaft bends during a swing is preferable. From this viewpoint, the length Ls of the shaft 6 is preferably greater than or equal to 1100 mm, more preferably greater than or equal to 1120 mm, and still more preferably greater than or equal to 1140 mm. From the same viewpoint, the length Ls of the shaft 6 is preferably less than or equal to 1210 mm, more preferably less than or equal to 1200 mm, and still more preferably less than or equal to 1190 mm.

In the present disclosure, a shaft in which the second region R2 tends to be largely deformed when the shaft bends during a swing is preferable. From this viewpoint, a ratio of a distance between the center position of the second region R2 and the tip end Tp to the length Ls of the shaft 6 is preferably greater than or equal to 67%, more preferably greater than or equal to 68%, and still more preferably greater than or equal to 69%. From the same viewpoint, the ratio of the distance between the center position of the second region R2 and the tip end Tp to the length Ls of the shaft 6 is preferably less than or equal to 78%, more preferably less than or equal to 77%, and still more preferably less than or equal to 76%. The center position of the second region R2 means a position located 850 mm apart from the tip end Tp.

The following Tables 1 and 2 show examples of prepregs that can be used for the shaft of the present disclosure. These prepregs are commercially available.

TABLE 1

Examples of utilizable prepregs

| Manufacturer | Trade name | Thickness of sheet (mm) | Weight per unit area (g/m$^2$) | Fiber content (% by weight) | Resin content (% by weight) | Physical property value of reinforcing fiber: Part number of fiber | Tensile elastic modulus (t/mm$^2$) | Tensile strength (kgf/mm$^2$) |
|---|---|---|---|---|---|---|---|---|
| Toray Industries, Inc. | 3255S-10 | 0.082 | 132 | 76 | 24 | T700S | 24 | 500 |
| Toray Industries, Inc. | 3255S-12 | 0.103 | 165 | 76 | 24 | T700S | 24 | 500 |
| Toray Industries, Inc. | 3255S-15 | 0.123 | 198 | 76 | 24 | T700S | 24 | 500 |
| Toray Industries, Inc. | 2255S-10 | 0.082 | 132 | 76 | 24 | T800S | 30 | 600 |
| Toray Industries, Inc. | 2255S-12 | 0.102 | 164 | 76 | 24 | T800S | 30 | 600 |
| Toray Industries, Inc. | 2255S-15 | 0.123 | 197 | 76 | 24 | T800S | 30 | 600 |
| Toray Industries, Inc. | 2256S-10 | 0.077 | 125 | 80 | 20 | T800S | 30 | 600 |
| Toray Industries, Inc. | 2256S-12 | 0.103 | 156 | 80 | 20 | T800S | 30 | 600 |
| Toray Industries, Inc. | 2276S-10 | 0.077 | 125 | 80 | 20 | T800S | 30 | 600 |
| Toray Industries, Inc. | 805S-3 | 0.034 | 50 | 60 | 40 | M30S | 30 | 560 |
| Toray Industries, Inc. | 8053S-3 | 0.028 | 43 | 70 | 30 | M30S | 30 | 560 |
| Toray Industries, Inc. | 8053S-3A | 0.023 | 36 | 70 | 30 | M30S | 30 | 560 |
| Toray Industries, Inc. | 8053S-5 | 0.045 | 71 | 70 | 30 | M30S | 30 | 560 |
| Toray Industries, Inc. | 17045G-10 | 0.082 | 132 | 76 | 24 | T1100G | 33 | 700 |
| Toray Industries, Inc. | 1704EG-7 TC | 0.055 | 92 | 82 | 18 | T1100G | 33 | 700 |
| Toray Industries, Inc. | 9255S-7A | 0.056 | 92 | 78 | 22 | M40S | 40 | 470 |
| Toray Industries, Inc. | 9255S-6A | 0.047 | 76 | 76 | 24 | M40S | 40 | 470 |
| Toray Industries, Inc. | 9053S-4 | 0.027 | 43 | 70 | 30 | M40S | 40 | 470 |
| Nippon Graphite Fiber Corporation | E1026A-09N | 0.100 | 151 | 63 | 37 | XN-10 | 10 | 190 |
| Nippon Graphite Fiber Corporation | E1026A-14N | 0.150 | 222 | 63 | 37 | XN-10 | 10 | 190 |

The tensile strength and the tensile elastic modulus are measured in accordance with "Testing Method for Carbon Fibers" JIS R7601: 1986.

TABLE 2

Examples of utilizable prepregs

| Manufacturer | Trade name | Thickness of sheet (mm) | Weight per unit area (g/m$^2$) | Fiber content (% by weight) | Resin content (% by weight) | Physical property value of reinforcing fiber: Part number of fiber | Tensile elastic modulus (t/mm$^2$) | Tensile strength (kgf/mm$^2$) |
|---|---|---|---|---|---|---|---|---|
| Mitsubishi Chemical Corporation | GE352H-160S | 0.150 | 246 | 65 | 35 | E glass | 7 | 320 |
| Mitsubishi Chemical Corporation | TR350C-100S | 0.083 | 133 | 75 | 25 | TR50S | 24 | 500 |
| Mitsubishi Chemical Corporation | TR350U-100S | 0.078 | 126 | 75 | 25 | TR50S | 24 | 500 |
| Mitsubishi Chemical Corporation | TR350C-125S | 0.104 | 167 | 75 | 25 | TR50S | 24 | 500 |
| Mitsubishi Chemical Corporation | TR350C-150S | 0.124 | 200 | 75 | 25 | TR50S | 24 | 500 |
| Mitsubishi Chemical Corporation | TR350C-175S | 0.147 | 233 | 75 | 25 | TR50S | 24 | 500 |
| Mitsubishi Chemical Corporation | MR350J-025S | 0.034 | 48 | 63 | 37 | MR40 | 30 | 450 |
| Mitsubishi Chemical Corporation | MR350J-050S | 0.058 | 86 | 63 | 37 | MR40 | 30 | 450 |
| Mitsubishi Chemical Corporation | MR350C-050S | 0.05 | 67 | 75 | 25 | MR40 | 30 | 450 |
| Mitsubishi Chemical Corporation | MR350C-075S | 0.063 | 100 | 75 | 25 | MR40 | 30 | 450 |
| Mitsubishi Chemical Corporation | MRX350C-075R | 0.063 | 101 | 75 | 25 | MR40 | 30 | 450 |
| Mitsubishi Chemical Corporation | MRX350C-100S | 0.085 | 133 | 75 | 25 | MR40 | 30 | 450 |
| Mitsubishi Chemical Corporation | MR350C-100S | 0.085 | 133 | 75 | 25 | MR40 | 30 | 450 |
| Mitsubishi Chemical Corporation | MRX350C-125S | 0.105 | 167 | 75 | 25 | MR40 | 30 | 450 |
| Mitsubishi Chemical Corporation | MRX350C-150S | 0.125 | 197 | 75 | 25 | MR40 | 30 | 450 |
| Mitsubishi Chemical Corporation | MR350C-125S | 0.105 | 167 | 75 | 25 | MR40 | 30 | 450 |
| Mitsubishi Chemical Corporation | MR350E-100S | 0.093 | 143 | 70 | 30 | MR40 | 30 | 450 |
| Mitsubishi Chemical Corporation | HRX350C-075S | 0.057 | 92 | 75 | 25 | HR40 | 40 | 450 |
| Mitsubishi Chemical Corporation | HRX350C-110S | 0.082 | 132 | 75 | 25 | HR40 | 40 | 450 |

The tensile strength and the tensile elastic modulus are measured in accordance with "Testing Method for Carbon Fibers" JIS R7601: 1986.

EXAMPLES

Example

A shaft having the same configuration as the shaft 6 in the above-described embodiment was produced in accordance with the above-described manufacturing processes of the shaft. The structure of sheets of the shaft was as shown in FIG. 2. The length Ls of the shaft was 1168 mm. The tip partial straight layer s1 and the specific butt straight layer s8 were glass fiber reinforced layers. As the specific butt hoop layer s6, the trade name "3255S-10" manufactured by Toray Industries, Inc. was used. The shaft weight was 41 g.

Comparative Example

A shaft of Comparative Example was obtained in the same manner as in Example except that the specific butt hoop layer s6 was replaced with a partial straight layer. As with the specific butt hoop layer s6 in Example, the trade name "3255S-10" was used as the prepreg of this partial straight layer.

<Measurement of Flexural Rigidity EI>

Flexural rigidity EI was measured in accordance with the above-described method. As shown in the following Tables 3 and 4, EI was measured at 50 mm intervals. Measured values and wall thicknesses t of Example are shown in below Table 3. Measured values and wall thicknesses t of Comparative Example are shown in below Table 4. The wall thicknesses t of Example were the same as the wall thicknesses t of Comparative Example at all positions.

TABLE 3

Specifications of Example

| Distance from tip end [mm] | Wall thickness t [mm] | EI [N · m$^2$] | EI/t — |
|---|---|---|---|
| 0 | 1.53 | — | — |
| 50 | 1.5 | — | — |
| 100 | 1.2 | — | — |
| 150 | 0.95 | 18 | 19 |
| 200 | 0.7 | 16 | 23 |
| 250 | 0.62 | 13 | 21 |
| 300 | 0.6 | 13 | 22 |

TABLE 3-continued

| Specifications of Example | | | |
|---|---|---|---|
| Distance from tip end [mm] | Wall thickness t [mm] | EI [N · m²] | EI/t — |
| 350 | 0.59 | 14 | 25 |
| 400 | 0.58 | 15 | 26 |
| 450 | 0.58 | 17 | 29 |
| 500 | 0.57 | 18 | 32 |
| 550 | 0.57 | 19 | 33 |
| 600 | 0.56 | 20 | 36 |
| 650 | 0.58 | 23 | 39 |
| 700 | 0.6 | 25 | 42 |
| 750 | 0.6 | 27 | 46 |
| 800 | 0.6 | 29 | 48 |
| 850 | 0.59 | 31 | 53 |
| 900 | 0.6 | 33 | 55 |
| 950 | 0.6 | 36 | 61 |
| 1000 | 0.61 | 40 | 66 |
| 1050 | 0.7 | 45 | 65 |
| 1100 | 0.72 | — | — |
| 1150 | 0.75 | — | — |

TABLE 4

| Specifications of Comparative Example | | | |
|---|---|---|---|
| Distance from tip end [mm] | Wall thickness t [mm] | EI [N · m²] | EI/t — |
| 0 | 1.53 | — | — |
| 50 | 1.5 | — | — |
| 100 | 1.2 | — | — |
| 150 | 0.95 | 19 | 20 |
| 200 | 0.7 | 17 | 24 |
| 250 | 0.62 | 14 | 23 |
| 300 | 0.6 | 14 | 23 |
| 350 | 0.59 | 15 | 25 |
| 400 | 0.58 | 16 | 28 |
| 450 | 0.58 | 17 | 29 |
| 500 | 0.57 | 18 | 32 |
| 550 | 0.57 | 20 | 35 |
| 600 | 0.56 | 21 | 38 |
| 650 | 0.58 | 25 | 43 |
| 700 | 0.6 | 36 | 60 |
| 750 | 0.6 | 41 | 68 |
| 800 | 0.6 | 48 | 80 |
| 850 | 0.59 | 54 | 92 |
| 900 | 0.6 | 58 | 97 |
| 950 | 0.6 | 63 | 105 |
| 1000 | 0.61 | 68 | 111 |
| 1050 | 0.7 | 70 | 100 |
| 1100 | 0.72 | — | — |
| 1150 | 0.75 | — | — |

Figure 4:
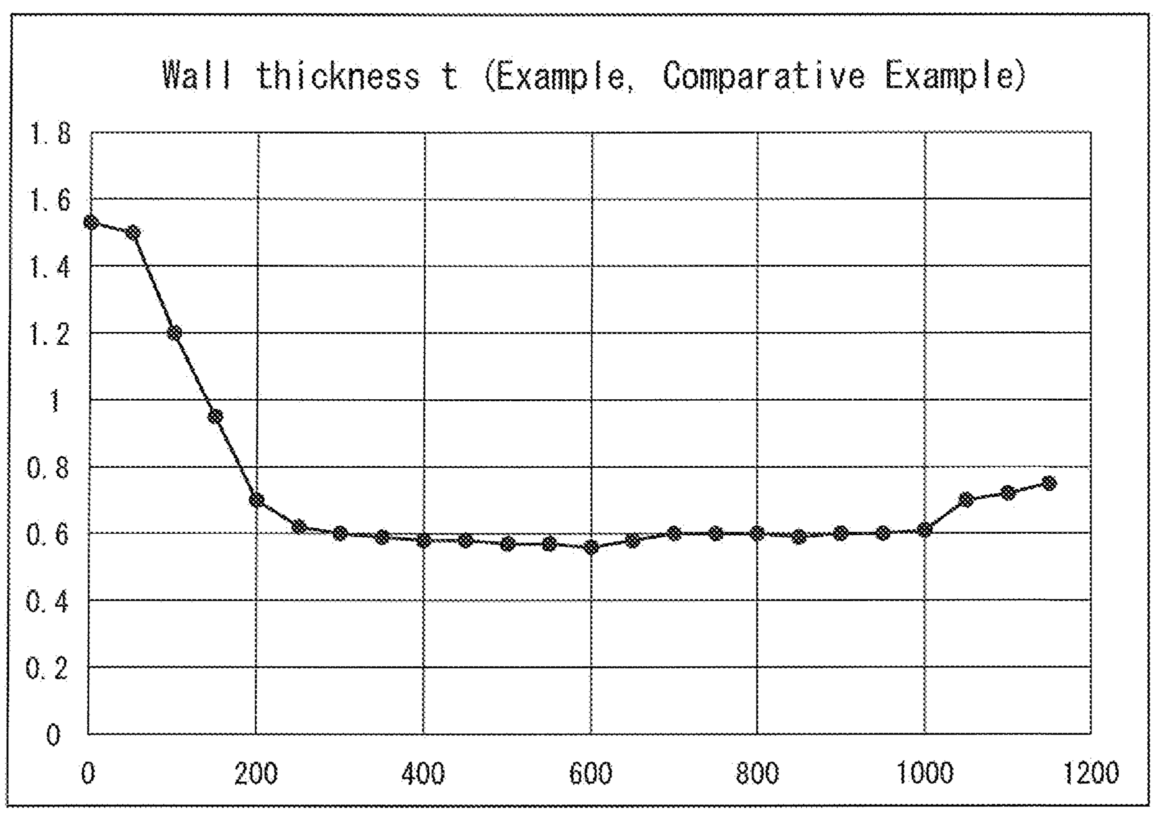
FIG. 4 is a graph that shows a wall thickness t profile of shafts of Example and Comparative Example.

FIG. 4 is a graph showing a wall thicknesses t profile in Example and Comparative Example. The horizontal axis of this graph represents a distance (unit: mm) from the tip end Tp. The vertical axis of this graph represents wall thickness t (unit: mm).

Figure 5:
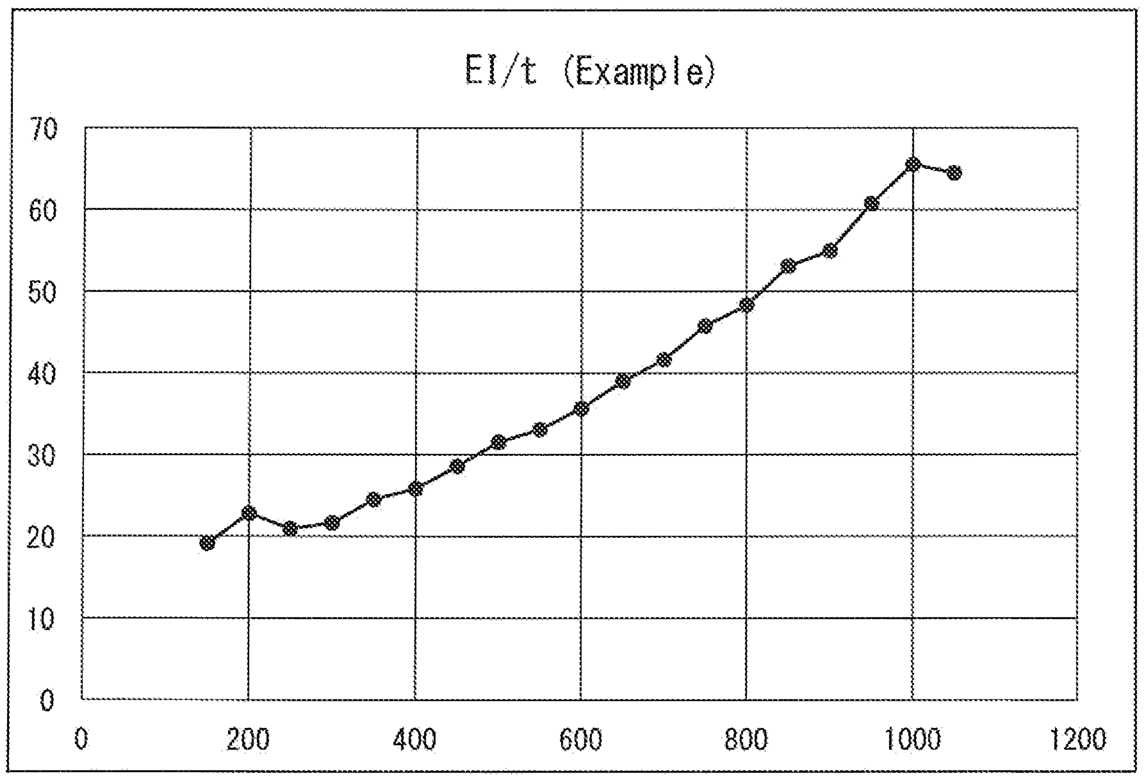
FIG. 5 is a graph that shows an EI/t profile in Example.

FIG. 5 is a graph showing an EI/t profile in Example. The horizontal axis of this graph represents a distance (unit: mm) from the tip end Tp. The vertical axis of this graph represents EI/t (unit: N·m²/mm).

Figure 6:
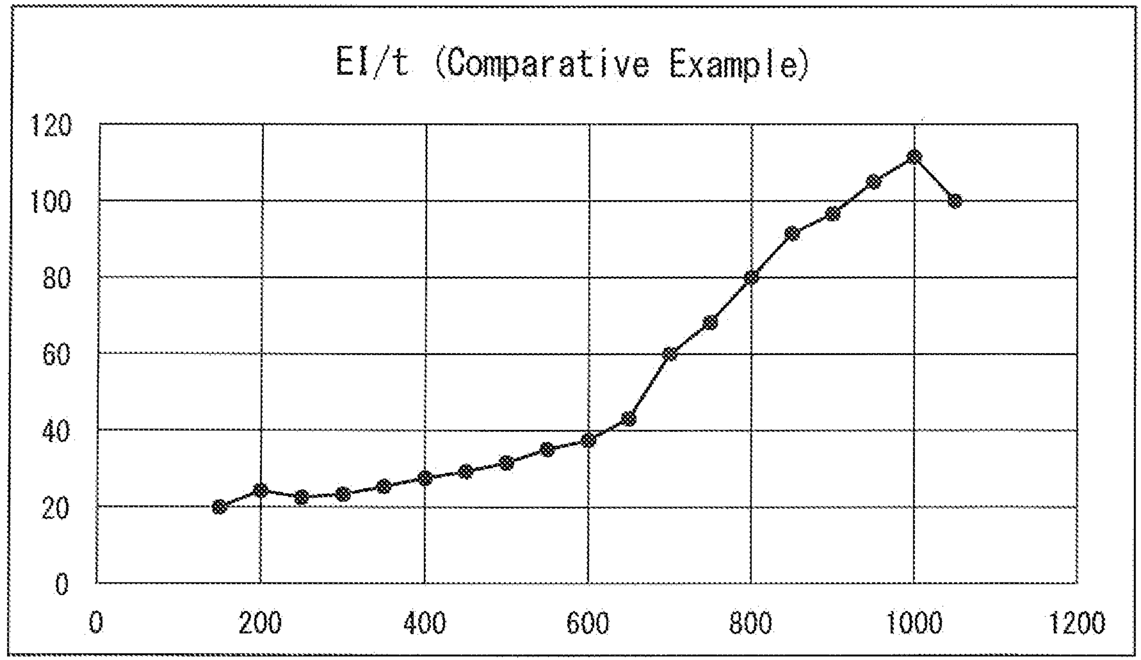
FIG. 6 is a graph that shows an EI/t profile in Comparative Example.

FIG. 6 is a graph showing an EI/t profile in Comparative Example. The horizontal axis of this graph represents a distance (unit: mm) from the tip end Tp. The vertical axis of this graph represents EI/t (unit: N·m²/mm).

As understood from Tables 3 and 4, an excessive increase of the flexural rigidity EI in the second region R2 was suppressed in Example. For this reason, the shaft of Example provides the average golfers whose head speed is relatively slow with a proper amount of bending in the second region R2 and easiness of swing. Further, as can be seen from FIG. 5 and FIG. 6, EI/t falls within an appropriate range in Example, and thus the shaft of Example is lightweight, is excellent in strength, and provides a proper amount of bending.

With reference to FIG. 4, a portion having the smallest wall thickness t is not present in the second region R2. Such a portion having the smallest wall thickness t is located on the tip side with respect to the second region R2. The portion having the smallest wall thickness t is located between the first region R1 and the second region R2. In particular, in the present embodiment, the portion having the smallest wall thickness t is located in a region that extends from a position located 450 mm apart from the tip end Tp to a position located 650 mm apart from the tip end Tp. Flexural deformation in the second region R2 during a swing is relieved by disposing the portion having the smallest wall thickness t on the tip side with respect to the second region R2. This reduces a load acting in the second region R2.

As shown in FIG. 5, in Example, EI/t increase as the distance from the tip end Tp increases in a region that extends from a position located 600 mm apart from the tip end Tp to a position located 900 mm apart from the tip end Tp.

As shown in FIG. 5, Example has small fluctuations in the rate of change of EI/t. For this reason, stress generated by bending of the second region R2 is dispersed, which can improve strength in Example. In addition, since the rate of change is small, EI/t in the second region R2 is prevented from becoming excessively large. From these viewpoints, it is preferable that fluctuations in the rate of change of EI/t are small in the second region E2 and also in a region that is adjacent to the second region R2 and that extends from a position located 600 mm apart from the tip end Tp to a position located 800 mm apart from the tip end Tp. Specifically, in a graph having a horizontal axis that represents a distance (mm) from the tip end and a vertical axis that represents EI/t (N·m²/mm), the rate of change of each of six regions that each have a length of 50 mm and are obtained by dividing a region extending from a position located 600 mm apart from the tip end to a position located 900 mm apart from the tip end into six equal parts is preferably less than or equal to 0.20, more preferably less than or equal to 0.15, still more preferably less than or equal to 0.13, and yet still more preferably less than or equal to 0.11. From the viewpoint of suppressing the fluctuations in the rate of change of EI/t and from the viewpoint of obtaining a proper EI/t in the second region R2, in the graph having the horizontal axis that represents a distance (mm) from the tip end and the vertical axis that represents EI/t (N·m²/mm), the rate of change of each of the six regions that each have a length of 50 mm and are obtained by dividing the region extending from the position located 600 mm apart from the tip end to the position located 900 mm apart from the tip end into six equal parts is preferably greater than or equal to 0.020, more preferably greater than or equal to 0.025, and still more preferably greater than or equal to 0.030.

The above-described rate of change means an inclination of a straight line segment that connects adjacent points in a line graph such as FIG. 5. The above-described six regions are: (1) a region that extends from a position located 600 mm apart from the tip end Tp to a position located 650 mm apart from the tip end Tp, (2) a region that extends from a position located 650 mm apart from the tip end Tp to a position located 700 mm apart from the tip end Tp, (3) a region that extends from a position located 700 mm apart from the tip end Tp to a position located 750 mm apart from the tip end Tp, (4) a region that extends from a position located 750 mm apart from the tip end Tp to a position located 800 mm apart from the tip end Tp, (5) a region that extends from a position located 800 mm apart from the tip end Tp to a position located 850 mm apart from the tip end Tp, and (6) a region that extends from a position located 850 mm apart from the tip end Tp to a position located 900 mm apart from the tip end Tp. With reference to Table 3, for example, the rate of change in the region that extends from a position located 600 mm apart from the tip end Tp to a position located 650 mm apart from the tip end Tp is calculated as follows:

$$(39-36)/50=0.06.$$

<Measurement of Strength>

A three-point flexural strength was measured at a position located 850 mm apart from the tip end Tp, which is the center position of the second region R2. The method for measuring the three-point flexural strength was as described above. The measurement was performed with a span of 300 mm.

The three-point flexural strength at the position located 850 mm apart from the tip end Tp was 95 kgf in Example, and was 97 kgf in Comparative Example. In general, a straight layer has a large contribution to flexural strength, whereas a hoop layer has a small contribution to flexural strength. Although a hoop layer was replaced with a straight layer in Comparative Example, the strength of Example was substantially equal to that of Comparative Example. Furthermore, Example had a strength of greater than or equal to 137% of the strength standard (40 kgf) stipulated by Consumer Product Safety Association in JAPAN for point A, point B and point C, and further greater than or equal to 2.37 times the strength standard. As such, by the use of the thick specific butt hoop layer, the flexural rigidity in the second region R2 was suppressed and the strength of the second region R2 was surely obtained.

The following clauses are a part of invention included in the present disclosure.

[Clause 1]

A golf club shaft being hollow, formed by a plurality of fiber reinforced resin layers, and including a tip end and a butt end, wherein the golf club shaft has a weight of less than or equal to 50 g, the golf club shaft has a flexural rigidity EI ($N \cdot m^2$) and a shaft wall thickness t (mm) at each position in an axial direction of the golf club shaft, in a first region that extends from a position located 200 mm apart from the tip end to a position located 300 mm apart from the tip end, EI/t is greater than or equal to 10 and less than or equal to 40, in a second region that extends from a position located 800 mm apart from the tip end to a position located 900 mm apart from the tip end, EI/t is greater than or equal to 45 and less than or equal to 80, the fiber reinforced resin layers include straight layers, a bias layer, and hoop layers, the straight layers include a full length straight layer that is disposed over an entire length of the golf club shaft and a partial straight layer that is disposed in a part of the entire length of the golf club shaft, the hoop layers include a full length hoop layer that is disposed over the entire length of the golf club shaft and a partial hoop layer that is disposed in a part of the entire length of the golf club shaft, the partial hoop layer includes a specific butt hoop layer that is not present in the first region and that is disposed over an entirety of the second region, and the specific butt hoop layer has a thickness of greater than or equal to 0.05 mm.

[Clause 2]

The golf club shaft according to clause 1, wherein the partial straight layer includes a tip partial straight layer that is disposed in a tip portion of the golf club shaft, and a butt partial straight layer that is disposed in a butt portion of the golf club shaft, and the butt partial straight layer includes a specific butt straight layer that is disposed on a butt side with respect to the second region and that is not present in the second region.

[Clause 3]

The golf club shaft according to clause 2, wherein the specific butt straight layer has a fiber elastic modulus of less than or equal to 10 $t/mm^2$.

[Clause 4]

The golf club shaft according to clause 3, wherein the specific butt straight layer is reinforced with glass fibers.

[Clause 5]

The golf club shaft according to clause 4, wherein the tip partial straight layer includes a glass fiber reinforced layer that is reinforced with glass fibers, and the glass fiber reinforced layer is disposed on a tip side with respect to the first region and is not present in the first region.

[Clause 6]

The golf club shaft according to any one of clauses 2 to 5, wherein only the specific butt straight layer is the butt partial straight layer is, and only the specific butt hoop layer is the partial hoop layer.

[Clause 7]

The golf club shaft according to any one of clauses 1 to 6, wherein the full length straight layer includes low resin content full length straight layers each having a resin content of less than or equal to 20% by weight, the specific butt hoop layer has a resin content of greater than 20% by weight, the low resin content full length straight layers include a first low resin content full length straight layer that is in contact with inside of the specific butt hoop layer, and a second low resin content full length straight layer that is in contact with outside of the specific butt hoop layer.

[Clause 8]

The golf club shaft according to any one of clauses 1 to 7, wherein the specific butt hoop layer has a thickness greater than a thickness of the full length hoop layer.

[Clause 9]

The golf club shaft according to any one of clauses 1 to 7, wherein in a graph having a horizontal axis that represents a distance (mm) from the tip end and a vertical axis that represents EI/t ($N \cdot m^2/mm$), a rate of change of each of six regions that each have a length of 50 mm and are obtained by dividing a region that extends from a position located 600 mm apart from the tip end to a position located 900 mm apart from the tip end into six equal parts is less than or equal to 0.20.

LIST OF REFERENCE SYMBOLS

2 Golf club
4 Head
6 Shaft
8 Grip
s1 to s12 Prepreg sheets (layers)
R1 First region
R2 Second region
t wall thickness of the shaft
Bt Butt end
Tp Tip end The above descriptions are merely illustrative and various modifications can be made without departing from the principles of the present disclosure.

The terminology used in the description of the various described embodiments herein is for the purpose of describing particular embodiments only and is not intended to be limiting. The use of the terms "a", "an", "the", and similar referents in the context of throughout this disclosure (especially in the context of the following claims) are to be construed to cover both the singular and the plural, unless otherwise indicated herein or clearly contradicted by context. As used throughout this disclosure, the word "may" is used in a permissive sense (i.e., meaning "having the potential to"), rather than the mandatory sense (i.e., meaning "must"). Similarly, as used throughout this disclosure, the terms "comprising", "having", "including", and "containing" are to be construed as open-ended terms (i.e., meaning "including, but not limited to,") unless otherwise noted.

What is claimed is:

1. A golf club shaft being hollow, formed by a plurality of fiber reinforced resin layers, and comprising a tip end and a butt end, wherein the golf club shaft has a weight of less than or equal to 50 g, the golf club shaft has a flexural rigidity EI ($N \cdot m^2$) and a shaft wall thickness t (mm) at each position in an axial direction of the golf club shaft, in a first region that extends from a position located 200 mm apart from the tip end to a position located 300 mm apart from the tip end, EI/t is greater than or equal to 10 and less than or equal to 40, in a second region that extends from a position located 800 mm apart from the tip end to a position located 900 mm apart from the tip end, EI/t is greater than or equal to 45 and less than or equal to 80, the fiber reinforced resin layers include straight layers, a bias layer, and hoop layers, the straight layers include a full length straight layer that is disposed over an entire length of the golf club shaft and a partial straight layer that is disposed in a part of the entire length of the golf club shaft, the hoop layers include a full length hoop layer that is disposed over the entire length of the golf club shaft and a partial hoop layer that is disposed in a part of the entire length of the golf club shaft, the partial hoop layer includes a specific butt hoop layer that is not present in the first region and that is disposed over an entirety of the second region, the specific butt hoop layer has a thickness of greater than or equal to 0.05 mm, the full length straight layer includes low resin content full length straight layers each having a resin content of less than or equal to 20% by weight, the specific butt hoop layer has a resin content of greater than 20% by weight, and the low resin content full length straight layers include a first low resin content full length straight layer that is in contact with inside of the specific butt hoop layer, and a second low resin content full length straight layer that is in contact with outside of the specific butt hoop layer.

2. The golf club shaft according to claim 1, wherein the partial straight layer includes a tip partial straight layer that is disposed in a tip portion of the golf club shaft, and a butt partial straight layer that is disposed in a butt portion of the golf club shaft, and the butt partial straight layer includes a specific butt straight layer that is disposed on a butt side with respect to the second region and that is not present in the second region.

3. The golf club shaft according to claim 2, wherein only the specific butt straight layer is the butt partial straight layer, and only the specific butt hoop layer is the partial hoop layer.

4. The golf club shaft according to claim 2, wherein the specific butt straight layer has a fiber elastic modulus of less than or equal to 10 $t/mm^2$.

5. The golf club shaft according to claim 4, wherein the specific butt straight layer is reinforced with glass fibers.

6. The golf club shaft according to claim 5, wherein the tip partial straight layer includes a glass fiber reinforced layer that is reinforced with glass fibers, and the glass fiber reinforced layer is disposed on a tip side with respect to the first region and is not present in the first region.

7. The golf club shaft according to claim 1, wherein the specific butt hoop layer has a thickness greater than a thickness of the full length hoop layer.

8. The golf club shaft according to claim 1, wherein in a graph having a horizontal axis that represents a distance (mm) from the tip end and a vertical axis that represents EI/t ($N \cdot m^2/mm$), a rate of change of each of six regions that each have a length of 50 mm and are obtained by dividing a region that extends from a position located 600 mm apart from the tip end to a position located 900 mm apart from the tip end into six equal parts is less than or equal to 0.20.

9. A golf club shaft being hollow, formed by a plurality of fiber reinforced resin layers, and comprising a tip end and a butt end, wherein the golf club shaft has a weight of less than or equal to 50 g, the golf club shaft has a flexural rigidity EI ($N \cdot m^2$) and a shaft wall thickness t (mm) at each position in an axial direction of the golf club shaft, in a first region that extends from a position located 200 mm apart from the tip end to a position located 300 mm apart from the tip end, EI/t is greater than or equal to 10 and less than or equal to 40, in a second region that extends from a position located 800 mm apart from the tip end to a position located 900 mm apart from the tip end, EI/t is greater than or equal to 45 and less than or equal to 80, the fiber reinforced resin layers include straight layers, a bias layer, and hoop layers, the straight layers include a full length straight layer that is disposed over an entire length of the golf club shaft and a partial straight layer that is disposed in a part of the entire length of the golf club shaft, the hoop layers include a full length hoop layer that is disposed over the entire length of the golf club shaft and a partial hoop layer that is disposed in a part of the entire length of the golf club shaft, the partial hoop layer includes a specific butt hoop layer that is not present in the first region and that is disposed over an entirety of the second region, the partial straight layer includes a tip partial straight layer that is disposed in a tip portion of the golf club shaft, and a butt partial straight layer that is disposed in a butt portion of the golf club shaft, the butt partial straight layer includes a specific butt straight layer that is disposed on a butt side with respect to the second region and that is not present in the second region, and in a graph having a horizontal axis that represents a distance (mm) from the tip end and a vertical axis that represents EI/t ($N \cdot m^2$/mm), a rate of change of each of six regions that each have a length of 50 mm and are obtained by dividing a region that extends from a position located 600 mm apart from the tip end to a position located 900 mm apart from the tip end into six equal parts is less than or equal to 0.20.

10. The golf club shaft according to claim 9, wherein the specific butt straight layer has a fiber elastic modulus of less than or equal to 10 t/$mm^2$.

11. The golf club shaft according to claim 9, wherein only the specific butt straight layer is the butt partial straight layer, and only the specific butt hoop layer is the partial hoop layer.

12. The golf club shaft according to claim 9, wherein the full length straight layer includes low resin content full length straight layers each having a resin content of less than or equal to 20% by weight, the specific butt hoop layer has a resin content of greater than 20% by weight, the low resin content full length straight layers include a first low resin content full length straight layer that is in contact with inside of the specific butt hoop layer, and a second low resin content full length straight layer that is in contact with outside of the specific butt hoop layer.

13. A golf club shaft being hollow, formed by a plurality of fiber reinforced resin layers, and comprising a tip end and a butt end, wherein the golf club shaft has a weight of less than or equal to 50 g, the golf club shaft has a flexural rigidity EI ($N \cdot m^2$) and a shaft wall thickness t (mm) at each position in an axial direction of the golf club shaft, in a first region that extends from a position located 200 mm apart from the tip end to a position located 300 mm apart from the tip end, EI/t is greater than or equal to 10 and less than or equal to 40, in a second region that extends from a position located 800 mm apart from the tip end to a position located 900 mm apart from the tip end, EI/t is greater than or equal to 45 and less than or equal to 80, the fiber reinforced resin layers include straight layers, a bias layer, and hoop layers, the straight layers include a full length straight layer that is disposed over an entire length of the golf club shaft and a partial straight layer that is disposed in a part of the entire length of the golf club shaft, the hoop layers include a full length hoop layer that is disposed over the entire length of the golf club shaft and a partial hoop layer that is disposed in a part of the entire length of the golf club shaft, the partial hoop layer includes a specific butt hoop layer that is not present in the first region and that is disposed over an entirety of the second region, the specific butt hoop layer has a thickness greater than a thickness of the full length hoop layer, the full length straight layer includes low resin content full length straight layers each having a resin content of less than or equal to 20% by weight, the specific butt hoop layer has a resin content of greater than 20% by weight, and the low resin content full length straight layers include a first low resin content full length straight layer that is in contact with inside of the specific butt hoop layer, and a second low resin content full length straight layer that is in contact with outside of the specific butt hoop layer.

14. The golf club shaft according to claim 13, wherein the partial straight layer includes a tip partial straight layer that is disposed in a tip portion of the golf club shaft, and a butt partial straight layer that is disposed in a butt portion of the golf club shaft, and the butt partial straight layer includes a specific butt straight layer that is disposed on a butt side with respect to the second region and that is not present in the second region.

15. The golf club shaft according to claim 14, wherein the specific butt straight layer has a fiber elastic modulus of less than or equal to 10 t/$mm^2$.

16. The golf club shaft according to claim 14, wherein only the specific butt straight layer is the butt partial straight layer, and only the specific butt hoop layer is the partial hoop layer.

17. The golf club shaft according to claim 13, wherein in a graph having a horizontal axis that represents a distance (mm) from the tip end and a vertical axis that represents EI/t ($N \cdot m^2$/mm), a rate of change of each of six regions that each have a length of 50 mm and are obtained by dividing a region that extends from a position located 600 mm apart from the tip end to a position located 900 mm apart from the tip end into six equal parts is less than or equal to 0.20.

* * * * *